United States Patent [19]
Hanschek

[11] Patent Number: 5,580,136
[45] Date of Patent: Dec. 3, 1996

[54] BRAKE SYSTEM FOR A MOTOR VEHICLE

[75] Inventor: Franz Hanschek, Markgröningen, Germany

[73] Assignee: Robert Bosch GmbH, Stuttgart, Germany

[21] Appl. No.: 453,022

[22] Filed: May 30, 1995

[30] Foreign Application Priority Data

Jun. 22, 1994 [DE] Germany .................. 44 21 774.9

[51] Int. Cl.$^6$ .................................................. B60T 8/60
[52] U.S. Cl. .................. 303/155; 303/166; 303/191; 477/186
[58] Field of Search ................................ 477/186, 187, 477/203, 204; 303/191, 166, 156, 155

[56] References Cited

U.S. PATENT DOCUMENTS

| | | | |
|---|---|---|---|
| 4,504,911 | 3/1985 | Braschel et al. | 364/426 |
| 5,060,159 | 10/1991 | Fennel | 303/166 X |
| 5,129,496 | 7/1992 | Sigl et al. | 477/186 X |
| 5,163,742 | 11/1992 | Töpfer et al. | 303/155 |
| 5,209,329 | 5/1993 | Sigl et al. | 477/186 |
| 5,372,411 | 12/1994 | Gerstenmaier et al. | 303/191 X |
| 5,375,918 | 12/1994 | Kuwana et al. | 303/155 X |
| 5,378,052 | 1/1995 | Yoshino | 303/155 X |
| 5,405,183 | 4/1995 | Aizawa et al. | 303/156 |
| 5,433,513 | 7/1995 | Takayama | 303/155 X |
| 5,487,598 | 1/1996 | Rivard et al. | 303/166 |

Primary Examiner—Charles A. Marmor
Assistant Examiner—Peter Kwon
Attorney, Agent, or Firm—Felfe & Lynch

[57] ABSTRACT

Valves for maintaining pressure at the vehicle brakes are activated when the vehicle reference speed falls below a predetermined value, whether the pressure is supplied by the brake pedal or an ASR. The energy supply for the valves is prevented from being switched off while the pressure is maintained.

6 Claims, 1 Drawing Sheet

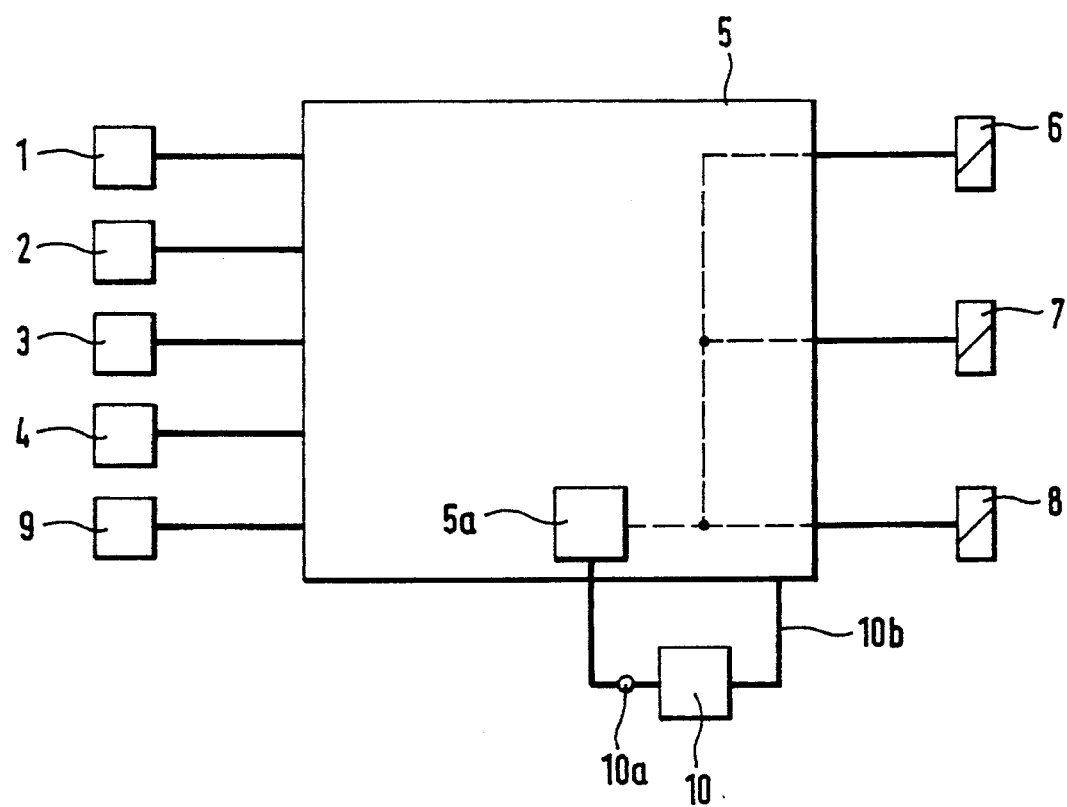

BRAKE SYSTEM FOR A MOTOR VEHICLE

PRIOR ART

U.S. Pat. No. 5,129,496 discloses a roll-inhibiting device for a motor vehicle in which pressure is fed into vehicle brakes and then held constant by at least one ABS (anti-lock system)/ASR (anti-slip regulation) valve if the vehicle falls below a low speed value and the brake pedal is simultaneously actuated. In this literature reference, a number of refinements of this process of firm braking are explained. Other algorithms for braking the wheels firmly when bringing the vehicle to a halt are also known.

The object of the present invention is to increase the reliability of an abovementioned roll-inhibiting device.

SUMMARY OF THE INVENTION

The invention starts from a brake system for a motor vehicle in which, after the vehicle speed has fallen below a specifiable value, at least one brake assigned to a vehicle wheel is actuated. The essence of the invention is that means are now provided by means of which the energy supply required to actuate the brake and/or maintain the operating condition of the actuated brake is prevented from being switched off during the actuation of the brake.

Irrespective of how the braking or firm braking of the vehicle wheels is brought about, the invention advantageously ensures that the firm braking is not cancelled by accidental or erroneous interruption of the energy supply to the brake or interruption of the power supply due to the ignition being switched off, for example. The roll-inhibiting device is not intended as a parking brake for the parking of the vehicle.

In an advantageous refinement to the invention, it is envisaged that, to actuate the brake, at least some of the brake-pressure control valves should be activated by a control unit.

The control unit can be an anti-lock system (ABS) and/or an anti-slip regulation (ASR) control unit, the brake-pressure control valves being the associated anti-lock control and/or anti-slip regulation valves.

In particular, provision can be made for the means to be configured in such a way that the control unit outputs a signal which is fed to the ignition lock interlock and hence inhibits the switching off of the ignition of the vehicle.

The ignition lock interlock is here supplied either solely or in addition with a valve-activating signal.

BRIEF DESCRIPTION OF THE DRAWING

The sole FIGURE is a schematic diagram of an exemplary brake system for practicing the invention.

DETAILED DESCRIPTION OF THE PREFERRED EMBODIMENT

The drawing shows an ABS comprising the speed sensors 1 to 4 assigned to the vehicle wheels, an evaluation circuit 5 and brake-pressure control valves 6 to 8 for modulating the brake pressure at the individual wheels. The evaluation circuit 5 (control unit) additionally contains a block 5a which receives a signal from a brake-light switch 9 during braking and receives from the evaluation circuit 5 a vehicle speed (reference) obtained from the wheel speeds. At a low speed and with the brake actuated (brake-light switch 9), signals are produced which trap the brake pressure present at the brakes by activating the pressure-maintaining position of the 3/3-way solenoid valves 6 to 8 and hence firmly brakes the wheels. If an ASR involving intervention by the brakes is provided, an additional increase in pressure can also take place. When the valves 6 to 8 are activated, the control block 5a outputs a signal to an inhibit input 10a of the ignition lock 10 to prevent the firm braking from being ended by accidental switching off of the ignition and hence switching off of the power supply to the evaluation circuit via line 10b. The inhibit input, which is present as standard in modern vehicles, prevents the ignition from being switched off while voltage is being applied to terminal 10a.

I claim:

1. Brake system for a motor vehicle having brakes assigned to vehicle wheels, said system comprising means for determining a vehicle reference speed, means for determining when said reference speed falls below a predetermined value, means for supplying pressure to said brakes, means for maintaining the pressure supplied to said brakes when said reference speed falls below a predetermined value, and means for preventing said means for maintaining the pressure from being switched off while said pressure is being maintained.

2. Brake system as in claim 1 wherein said means for supplying pressure to said brakes comprises a brake pedal, said means for maintaining the pressure supplied by said brake pedal maintaining said pressure even after said brake pedal has been released.

3. Brake system as in claim 1 wherein said means for supplying pressure to said brakes comprises ASR means for supplying pressure at least one wheel, said means for maintaining pressure maintaining the pressure supplied by said ASR means when said reference speed falls below a predetermined value.

4. Brake system as in claim 1 wherein said means for maintaining the pressure supplied to said brakes comprises brake pressure control valves assigned to respective brakes, and an evaluation circuit for activating said brake pressure control valves.

5. Brake system as in claim 4 wherein said evaluation circuit comprises at least one of an anti-lock system (ABS) and an anti-slip regulation system (ASR).

6. Brake system as in claim 4 wherein said means for preventing said means for maintaining pressure from being switched off comprises an ignition interlock which inhibits switching off the ignition of the vehicle in response to a signal from said evaluation circuit indicating that said pressure is being maintained.

\* \* \* \* \*